(12) United States Patent
Blessinger et al.

(10) Patent No.: US 6,450,315 B1
(45) Date of Patent: Sep. 17, 2002

(54) SPRING FERRULE FOR FRICTION CLUTCH WITH AUTOMATIC ADJUSTMENT FEATURE

(75) Inventors: Jeffrey S. Blessinger, Auburn, IN (US); John David Conrad, Auburn, IN (US); G. Andrew Pepple, Corunna, IN (US)

(73) Assignee: Eaton Corporation, Cleveland, OH (US)

( * ) Notice: Subject to any disclaimer, the term of this patent is extended or adjusted under 35 U.S.C. 154(b) by 22 days.

(21) Appl. No.: 09/740,394

(22) Filed: Dec. 19, 2000

(51) Int. Cl.$^7$ ............................................. F16D 13/75
(52) U.S. Cl. ................ 192/70.25; 192/111 A; 267/179
(58) Field of Search .............. 192/70.25, 111 A; 267/170, 174, 179; 464/61, 67; 403/111, 229; 248/617

(56) References Cited

U.S. PATENT DOCUMENTS

| | | | |
|---|---|---|---|
| 1,079,925 A | * 11/1913 | Prather | 267/179 X |
| 4,032,129 A | * 6/1977 | Larsson | 267/179 |
| 4,207,972 A | * 6/1980 | Zeidler | 192/111 A |
| 5,595,275 A | * 1/1997 | Gochenour et al. | 192/111 A |
| 5,791,448 A | * 8/1998 | Gochenour et al. | 192/70.25 |
| 6,098,773 A | * 8/2000 | Blessinger et al. | 192/70.25 |

FOREIGN PATENT DOCUMENTS

SU 1762030 A1 * 9/1992 ................. 267/179

* cited by examiner

Primary Examiner—Richard M. Lorence
(74) Attorney, Agent, or Firm—Kevin M. Hinman

(57) ABSTRACT

A cover assembly for a friction clutch for a motor vehicle includes a cover and a ferrule. The cover has a ferrule aperture passing therethrough from an outer side to a inner side. The ferrule is a one piece unitary structure and is disposed in the ferule aperture. The ferrule has a spring receiving portion and a base portion and axis of orientation passing through both the spring receiving portion and the base portion. The spring receiving portion projects from the ferrule aperture beyond the inner side. The spring receiving portion has a spring aperture. The base portion has a pilot portion disposed within the ferrule aperture. The pilot portion is of a size complementary to the ferrule aperture. The size of the pilot portion is selected to enable the ferrule to be positively positioned within the ferrule aperture. The base portion also has a travel limit portion extending radially beyond the ferrule aperture and engaging the outer side of the cover to prevent the base portion from passing through the cover.

14 Claims, 4 Drawing Sheets

SPRING FERRULE FOR FRICTION CLUTCH WITH AUTOMATIC ADJUSTMENT FEATURE

FIELD OF THE INVENTION

This invention relates to the field of friction clutches having automatic adjustment features, and more particularly to friction clutch automatic adjustment features employing a spring ferrule to retain one end of an adjustment spring.

BACKGROUND OF THE INVENTION

Known friction clutches provide a releasable torsional connection between a motor vehicle engine flywheel and an associated transmission. Repeated clutch disengagement and engagement cycles wear the friction material of the clutch driven disc. As the friction material wears, the clutch clamping load generated by a spring acting directly or indirectly against the pressure plate tends to decrease. Clutches are commonly provided with adjustment mechanisms to compensate for wear of the friction material and the attendant loss of clamping load. Cam elements and helical threads are two alternative devices employed as adjusting mechanisms. Relative rotation between the cam elements or between the threaded elements produces an axial displacement which compensates for the wear of the friction material. A spring or springs are used to induce the necessary relative rotation. One known cam adjustment mechanism employs a coil type tension spring. The spring has a working portion of a first coil diameter, and end portions of a second coil diameter disposed at each end of the working portion. The second coil diameter is significantly smaller than the first coil diameter. At the extreme ends of the end portions are flare portions which taper, in a relatively short axial distance, to an end coil of approximately the same coil diameter as the working portion. The flared portion on a first end is connected to the rotatable cam for movement therewith. The flared portion on the second end engages the clutch cover through a spring ferrule mounted to a bracket as shown in FIG. 3. The use of a bracket is disadvantageous in at least two regards. First, the inclusion of the bracket adds cost, assembly complexity and a potential source of noise to the clutch assembly. Second, it requires that there be a break or a gap in the circumferential dust baffle. The dust baffle is disposed radially inwardly of the cams and protects the cams from dirt and grease thrown radially outwardly by the rotating clutch. The gap necessitated by the bracket compromises the effectiveness of the baffle.

It is desired to provide a spring ferrule which can be mounted to the clutch cover without the use of a bracket.

SUMMARY OF THE INVENTION

A cover assembly for a friction clutch for a motor vehicle includes a cover and a ferrule. The cover has a ferrule aperture passing therethrough from an outer side to an inner side. The ferrule is a one piece unitary structure and is disposed in the ferrule aperture. The ferrule has a spring receiving portion and a base portion and an axis of orientation passing through both the spring receiving portion and the base portion. The spring receiving portion projects from the ferrule aperture beyond the inner side. The spring receiving portion has a spring aperture. The base portion has a pilot portion disposed within the ferrule aperture. The pilot portion is of a size complementary to the ferrule aperture. The size of the pilot portion is selected to enable the ferrule to be positively positioned within the ferrule aperture. The base portion also has a travel limit portion extending radially beyond the ferrule aperture and engaging the outer side of the cover to prevent the base portion from passing through the cover.

A friction clutch for a motor vehicle includes a cover, a pressure plate, a biasing member, an adjustment mechanism, a tension coil spring, and a spring ferrule. The cover has an axis of rotation, and also has an inner side and an outer side opposite the inner side. The cover has a ferrule aperture passing therethrough from the outer side to the inner side. The pressure plate is coupled to the cover for rotation therewith about the axis and disposed on the inner side of the cover. The biasing member is interposed between the cover and the pressure plate and biases the pressure plate toward an engaged pressure plate position. The adjustment mechanism is centered about the axis and is operably disposed between the cover and the biasing member. The tension coil spring is part of the adjustment mechanism and has an end feature. The spring ferrule is fixedly disposed in the ferrule aperture. The ferrule is a one piece unitary structure. The ferrule has a spring receiving portion and a base portion and an axis of orientation passing through both the spring receiving portion and the base portion. The spring receiving portion projects from the ferrule aperture beyond the inner side. The spring receiving portion has a spring aperture receiving the end feature of the spring. The base portion has a pilot portion disposed within the ferrule aperture. The pilot portion is of a size complementary to the ferrule aperture. The size of the pilot portion is selected to enable the ferrule to be positively positioned within the ferrule aperture. The base portion also has a travel limit portion extending radially beyond the ferrule aperture and engaging the outer side of the cover to prevent the base portion from passing through the cover.

The disclosed spring ferrule can be mounted to a clutch cover without the use of a bracket.

The disclosed clutch cover accommodates the retention of a spring ferrule without the use of a bracket.

DESCRIPTION OF PREFERRED EMBODIMENTS

Figure 1:
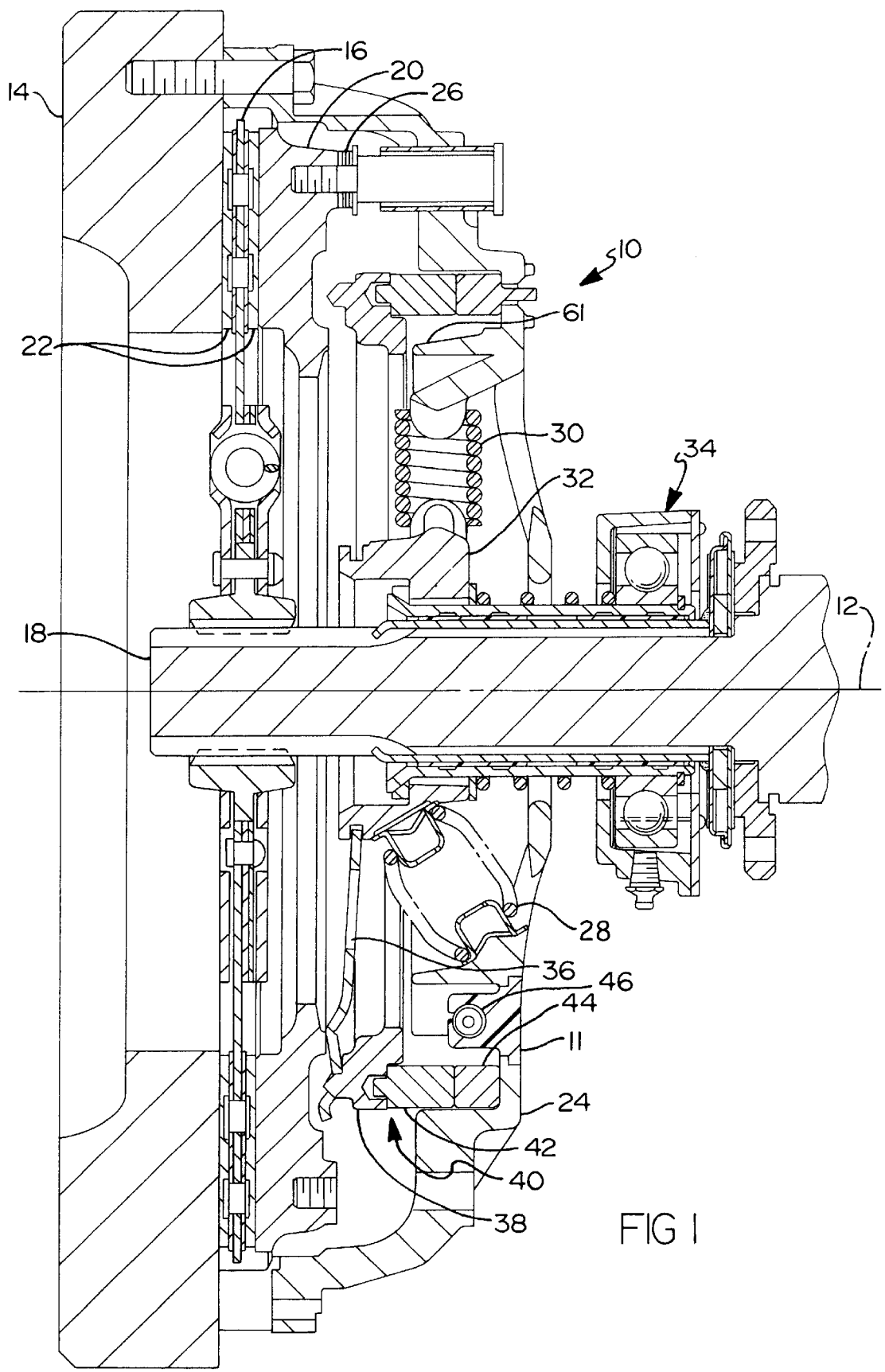
FIG. 1 is a sectional side view of a clutch.

A frictional clutch 10 for a motor vehicle employing the inventive spring ferrule 11 is shown in FIG. 1. Clutch 10 rotates about an axis 12. A flywheel 14 is rotatably fixed to a crankshaft of a motor vehicle engine (not shown). A driven disc assembly 16, centered with respect to axis 12, has a splined hub which slidably engages a splined input shaft 18. Driven disc 16 is sandwiched between flywheel 14 and a pressure plate 20. Driven disc 16 has friction elements 22 which are engaged by flywheel 14 and pressure plate 20 when clutch 10 is in an engaged condition.

A clutch cover 24 is disposed over pressure plate 20 and is fixed to flywheel 14. A plurality of straps 26 circumferentially extend between cover 24 and a radially extending flange of pressure plate 20. Straps 26 rotatably fix pressure plate 20 to cover 24 while allowing relative axial displacement of pressure plate 20 to cover 24.

A plurality of pressure springs 28, typically six, and a plurality of assist springs 30, typically three, are disposed between cover 24 and a retainer 32 of release assembly 34. Radially inner tips of levers 36 engage retainer 32. The axial load of springs 28 against retainer 32 is transferred through levers 36 to pressure plate 20. Levers 36 react against and pivot on pivot ring 38. Pivot ring 38 serves as an axial extension of cover 24. The spring biased levers 36 operate as a biasing member, biasing pressure plate 20 away from cover 24. The load from the springs clamps driven disc 16 between pressure plate 20 and flywheel 14 to rotatably connect or lock input shaft 18 with flywheel 14 when clutch 10 is in the engaged position shown in FIG. 1.

Alternatively, biasing members could include a diaphragm spring having fingers which would engage pressure plate 20, in place of coil springs 28 and 30 and levers 36. With such a diaphragm spring, the spring load would be largely provided by an outer annular portion of the spring. Yet alternatively, a diaphragm spring without fingers may be employed in combination with levers with the diaphragm spring biasing the levers.

Clutch 10 is selectively released or disengaged by axially displacing release assembly 34 along axis 12 in a direction away from flywheel 14. Such displacement is achieved by a vehicle operator through a pedal operated clutch linkage (not shown). As the radially inner tips of levers 36 are axially displaced away from flywheel 14, fingers 36 pivot about pivot ring 38 and away from flywheel 14, thereby relieving the clamping load against pressure plate 20, and permitting rotation of input shaft 18 relative to flywheel 14.

An adjustment mechanism 40 is disposed between pivot ring 38 and cover 24. Adjustment mechanism 40 is used to compensate for wear of friction elements 22. Compensation is achieved by shifting the pivot point of levers 36 toward flywheel 14 as friction material 22 wears to maintain a near constant clamping load of pressure plate 20 against driven disc assembly 16 in the engaged condition.

Figure 2:
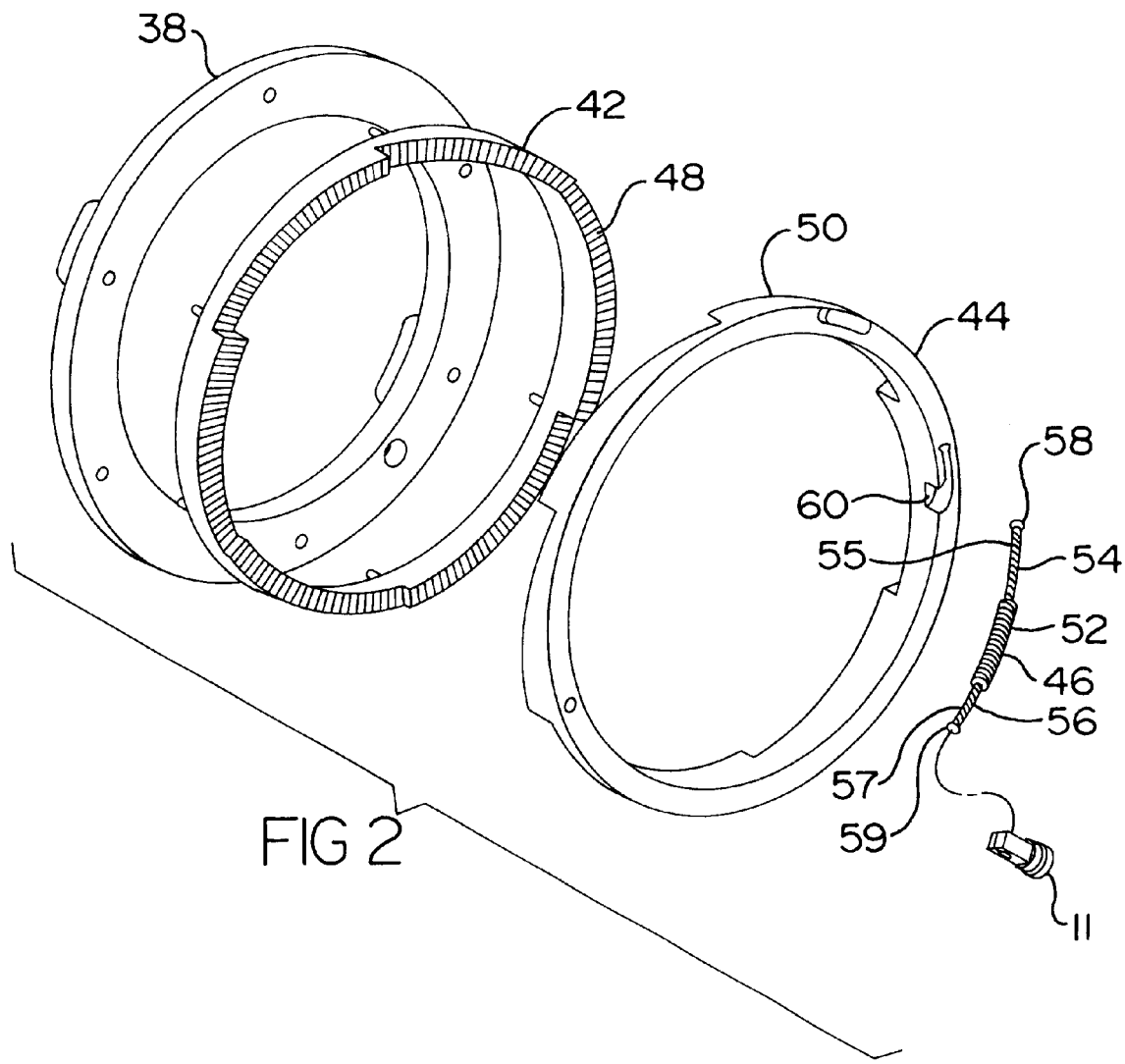
FIG. 2 is an exploded view showing the positioning relationship between the pivot ring, the cams, the cam spring and the spring ferrule.

The adjustment mechanism 40 comprises, in its most basic elements, first and second relatively rotatable annular cams 42 and 44 and a spring 46. Cams 42 and 44, best shown in FIG. 2, may be formed of any adequately rigid material including plastic and steel. Spring 46 induces relative rotation between cams 42 and 44. First cam 42 is stationary or non-rotatable relative to cover 28 and pressure plate 20. First cam 42 is rotatably fixed to pivot ring 38 by a plurality of axially extending pins which engage apertures in pivot ring 38. Potentially, pivot ring 38 and first cam 42 could be formed together as a unit. First cam 44 and second cam 46 have first cam surfaces 48 and second cam surfaces 50 respectively in mutual engagement. Cam surfaces 48 and 50 are defined by wedges formed in cams 42 and 44. Each of cam surfaces 48 and 50 define a plurality of small teeth which prevent undesired relative rotational slipping of cams 42 and 44. Both first cam 42 and second cam 44 are concentric with axis 12.

Cam spring 46 is a coil type tension spring. Spring 46 has a working portion 52 of a first coil diameter, and first and second end portions 54 and 56 disposed at each end of working portion 52. Both first and second end portions 54 and 56 have reduced diameter portions 55 and 57 which have a second coil diameter which is significantly smaller than the first coil diameter. Reduced diameter portions 55 and 57 are tipped by flared portions 58 and 59 respectively. Flare portions 58 and 59 taper outwardly, in a relatively short axial distance, from the second coil diameter to an end coil of approximately the first coil diameter. Second end portion 56 engages spring ferrule 11 which is in turn fixed to cover 24. First end portion 54 engages second cam 44. A spring slot 60 in second cam 44 receives first end portion 54. A dust baffle 61 in the form of an axially extending wall circumscribes clutch cover 24 radially inwardly of cams 42 and 44, protecting cams 42 and 44 and surfaces 48 and 50 from the intrusion of material radiating outwardly from release assembly 34 and other clutch components disposed radially inwardly of cams 42 and 44.

Figure 3:
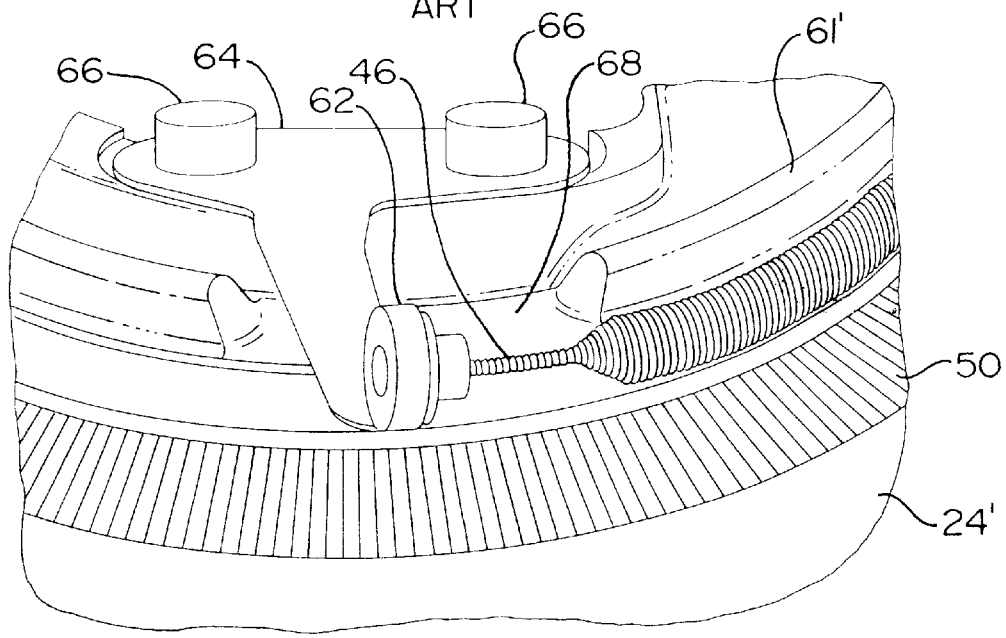
FIG. 3 is a broken-out perspective view of a prior art clutch in the area of the spring ferrule.

As best shown in FIG. 3 prior art spring ferrule 62 is retained to cover 24' by a bracket 64. Housing 24' includes mounting bosses 66 received by apertures in bracket 64. Dust baffle 61' has a gap 68 to permit bracket 64 to hold ferrule 62 in the path of spring 46. The benefit provided by ferrule 11 in the elimination of bracket 64, bosses 66 and gap 68 is readily apparent.

Figure 4:
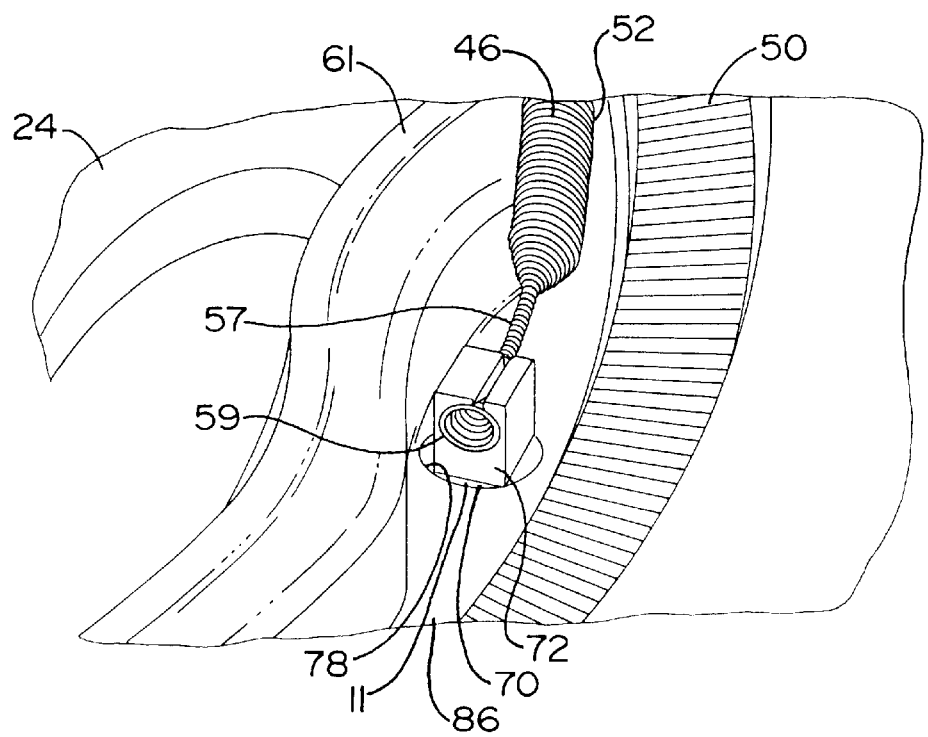
FIG. 4 is a broken-out perspective view of the clutch in the area of the spring ferrule.

Ferrule 11 is shown in an installed position in FIG. 4. Ferrule 11 projects through cover 24 from an outer surface 90 on the outside of cover 24 to an inner surface 86 on an inside of cover 24. Dust baffle 61 is not interrupted, but instead curves around the location of ferrule 11. Tension in spring 46 prevents ferrule 11 from falling out of cover 24.

Figure 5:
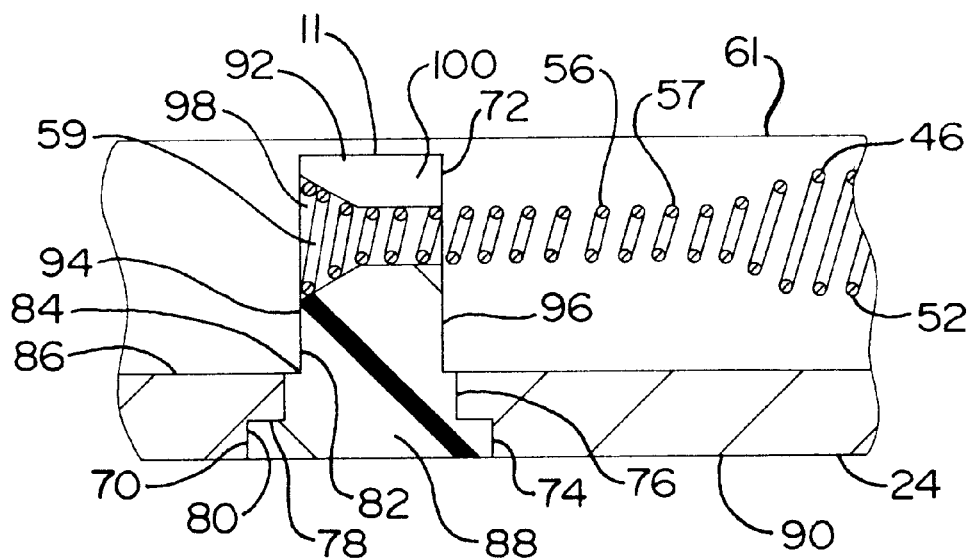
FIG. 5 is a broken-out sectional view of the spring ferrule in an installed condition.
Figure 6:
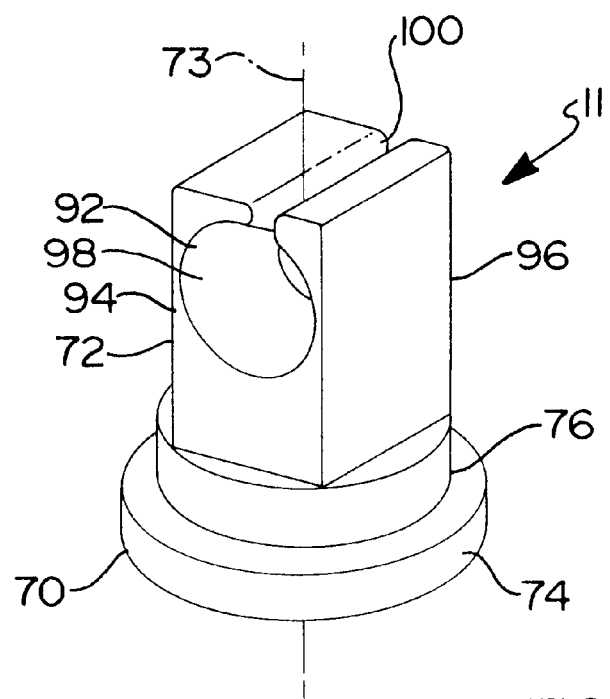
FIG. 6 is a perspective view of the spring ferrule.

Spring ferrule 11 is shown in more detail in FIGS. 5 and 6. As shown in FIG. 5, spring ferrule 11 is a unitary one piece structure having both a circular base portion 70 and a box shaped spring receiving portion 72. An axis of orientation 73 passes through both base portion 70 and spring receiving portion 72. Base portion 70 has a first diameter portion or travel limit portion 74, and is stepped down to a small diameter second diameter portion or pilot portion 76 proximate to receiving portion 72. A ferrule receiving aperture 78 in cover 24 in the form of a stepped bore has first and second diameter portions 80 and 82 complementary in diameter and length to first and second diameter portions 74 and 76. There is a piloting relationship between bore diameter portions 80, 82 and base diameter portions 74, 76 respectively. Travel limit portion 74 overlies a shoulder of bore 78 to the extent it is larger than first diameter portion 80 of bore 78. By its engagement with cover 24, travel limit portion 80 prevents base portion 70 from passing through aperture 78 and through cover 24. The stepped diameter arrangement enables base portion 70 to be received and retained by stepped bore 78 and to positively position ferrule 11 on cover 24. The stepped configuration of base portion 70 and aperture 78 enable an inner surface 84 of base portion 70 to be flush with the inner side or surface 86 of cover 24, and an outer surface 88 of base portion 70 to be flush with the outer side or surface 90 of cover 24.

Receiving portion 72 has a slotted spring receiving aperture 92 extending from a first side 94 of spring receiving portion 72 to an oppositely facing second side 96. Aperture 92 has a tapered spring seat 98 which receives flared portion 59. Spring seat 98 is substantially frustaconical in shape, tapering from, on first side 94, a large diameter approximately equal to the first coil diameter to, at a point intermediate between first side 94 and second side 96, a smaller diameter complementary to the second coil diameter. A U-shaped slot 100 extends between first 94 and second side 96, intersecting spring seat 98. The bottom of slot 100 is concentric with spring seat 98 and extends from the small diameter end of spring seat 98 to second side 96. Slot 100 is complementary in width to reduced diameter portion 57, freely receiving reduced diameter portion 57.

Spring ferrule 11 retains second end portion 56 so long as spring 46 remains in tension. Spring 46 operates to cause second cam 44 to rotate relative to cam 42 to increase the combined height or thickness of cams 42 and 44 responsive to the wear of friction elements 22.

Spring ferrule 11 is advantageously installed in cover 24 by simply pressing it into place from the outside cover 24. Spring ferrule 11 needs no bracket to retain it in cover 24. When spring 46 is installed, spring ferrule 11 cannot be dislodged from cover 24. The stepped disc configuration of base portion 70 is beneficial in that it permits stepped bore 78 to be easily formed by counterboring. Also, the resultant flush mounting on the outer surface minimizes the risk of damage to ferrule 11.

It should be appreciated that there are readily apparent alternative embodiments to the above described clutch configurations. For example, bore 78 and base portion 70 could assume other configurations, particularly if bore 78 were to be cast in cover 24. Or, the shape of spring receiving portion could be other than box shaped. Further, a stamped clutch cover could be used in place of the cast cover shown. Second end 56 could terminate in a hook instead of a flared portion 59 and a simple aperture could be used in receiving portion instead of slotted aperture 92. Also, the bore 78 could be a single diameter instead of stepped. Also, a travel limit portion or feature could be defined by one or more radially legs in place of the disclosed stepped arrangement, or a non-circular shape.

The embodiments disclosed herein have been discussed for the purpose of familiarizing the reader with the novel aspects of the invention. Although preferred embodiments of the invention have been shown and disclosed, many changes, modifications and substitutions may be made by one having ordinarily skill in the art without necessarily departing from the spirit and scope of the invention as described in the following claims.

We claim:

1. A cover assembly for a friction clutch for a motor vehicle comprising:
   a cover having a ferrule receiving aperture passing therethrough from an outer side to an inner side; and
   a ferrule being a one piece unitary structure disposed in the ferrule receiving aperture, the ferrule having a spring receiving portion and a base portion and an axis of orientation passing through both the spring receiving portion and the base portion,
      the spring receiving portion projecting from the ferrule aperture beyond the inner side and the spring receiving portion having a spring aperture,
      the base portion having a pilot portion disposed within the ferrule aperture, the pilot portion being of a size complementary to the ferrule aperture and the size of the pilot portion being selected to enable the ferrule to be positively positioned within the ferrule aperture, and the base portion also having a travel limit portion extending radially beyond the pilot portion and engaging the cover to prevent the base portion from passing through the cover;
   wherein the spring aperture extends from a first side of the spring receiving portion and includes a tapered seat proximate to the first side of the spring receiving portion and the spring receiving portion has a slot intersecting the tapered seat and extending from the tapered seat to a second side of the spring receiving portion.

2. A cover assembly as claimed in claim 1 wherein the slot is disposed on a side of the spring receiving portion most distal to the base portion.

3. A cover assembly for a friction clutch for a motor vehicle comprising:
   a cover having a ferrule receiving aperture passing therethrough from an outer side to an inner side; and
   a ferrule being a one piece unitary structure disposed in the ferrule receiving aperture, the ferrule having a spring receiving portion and a base portion and an axis of orientation passing through both the spring receiving portion and the base portion,
      the spring receiving portion projecting from the ferrule aperture beyond the inner side and the spring receiving portion having a spring aperture,
      the base portion having a pilot portion disposed within the ferrule aperture, the pilot portion being of a size complementary to the ferrule aperture and the size of the pilot portion being selected to enable the ferrule to be positively positioned within the ferrule aperture, and the base portion also having a travel limit portion extending radially beyond the pilot portion and engaging the cover to prevent the base portion from passing through the cover;
   wherein the base portion comprises a first base diameter portion and a second base diameter portion disposed within respectively a first diameter portion of the ferrule aperture and a second diameter portion of the ferrule aperture with the first base diameter portion being larger than the second base diameter portion and the first diameter portion of the ferrule aperture being larger than the second diameter portion of the ferrule aperture at least one of the first base diameter portion and the second base diameter portion serving as the pilot portion and the first base diameter portion serves as the travel limit portion.

4. A cover assembly as claimed in claim 3 wherein the end of the travel limit portion most distal to the receiving portion is substantially flush with an outer surface of the cover, the outer surface being disposed on an outside of the cover.

5. A friction clutch for a motor vehicle having a cover having an axis of rotation and also having an inner side and an outer side opposite the inner side; a pressure plate coupled to the cover for rotation therewith about the axis and disposed on the inner side of the cover; a biasing member interposed between the cover and the pressure plate biasing the pressure plate toward an engaged pressure plate position; an adjustment mechanism centered about the axis and operably disposed between the cover and the biasing member; a tension coil spring being part of the adjustment mechanism and having an end feature; a spring ferrule fixed relative to the cover receiving the end feature of the spring; the improvement comprising:
   the cover having a ferrule aperture passing therethrough from the outer side to the inner side; and
   the ferrule being a one piece unitary structure disposed in the ferrule aperture, the ferrule having a spring receiving portion and a base portion and an axis of orientation passing through both the spring receiving portion and the base portion,
      the spring receiving portion projecting from the ferrule aperture beyond the inner side and the spring receiving portion having a spring aperture receiving the end feature, and
      the base portion having a pilot portion disposed within the ferrule aperture, the pilot portion being of a size complementary to the ferrule aperture and the size of the pilot portion being selected to enable the ferrule to be positively positioned within the ferrule aperture, and the base portion also having a travel limit portion extending radially beyond the pilot portion and engaging the cover to prevent the base portion from passing through the cover.

6. A friction clutch as claimed in claim 5 wherein the spring aperture extends from a first side of the spring receiving portion and includes a tapered seat proximate to the first side of the spring receiving portion and the spring receiving portion has a slot intersecting the tapered seat and extending from the tapered seat to the second side of the spring receiving portion.

7. A friction clutch as claimed in claim 6 wherein the slot is disposed on a side of the spring receiving portion most distal to the base portion.

8. A friction clutch as claimed in claim 5 wherein the base portion comprises a first base diameter portion and a second base diameter portion disposed within respectively a first diameter portion of the ferrule aperture and a second diameter portion of the ferrule aperture with the first base diameter portion being larger than the second base diameter portion and the first diameter portion of the ferrule aperture being larger than the second diameter portion of the ferrule aperture at least one of the first base diameter portion and the second base diameter portion serving as the pilot portion and the first base diameter portion serves as the travel limit portion.

9. A friction clutch as claimed in claim 5 wherein the end of the travel limit portion most distal to the receiving portion is substantially flush with an outer surface of the cover, the outer surface being disposed on an outside of the cover.

10. A friction clutch for a motor vehicle comprising:

a cover having an axis of rotation and also having an inner side and an outer side opposite the inner side and having a ferrule aperture passing therethrough from the outer side to the inner side;

a pressure plate coupled to the cover for rotation therewith about the axis and disposed on the inner side of the cover;

a biasing member interposed between the cover and the pressure plate biasing the pressure plate toward an engaged pressure plate position;

an adjustment mechanism centered about the axis and operably disposed between the cover and the biasing member;

a tension coil spring being part of the adjustment mechanism and having an end feature;

a spring ferrule fixedly disposed in the ferrule aperture, the ferrule being a one piece unitary structure, the ferrule having a spring receiving portion and a base portion and an axis of orientation passing through both the spring receiving portion and the base portion, the spring receiving portion projecting from the ferrule aperture beyond the inner side and the spring receiving portion having a spring aperture receiving the end feature of the spring, and the base portion having a pilot portion disposed within the ferrule aperture, the pilot portion being of a size complementary to the ferrule aperture and the size of the pilot portion being selected to enable the ferrule to be positively positioned within the ferrule aperture, and the base portion also having a travel limit portion extending radially beyond the pilot portion and engaging the cover to prevent the base portion from passing through the cover.

11. A friction clutch as claimed in claim 10 wherein the spring aperture extends from a first side of the spring receiving portion and includes a tapered seat proximate to the first side of the spring receiving portion and the spring receiving portion has a slot intersecting the tapered seat and extending from the tapered seat to the second side of the spring receiving portion.

12. A friction clutch as claimed in claim 11 wherein the slot is disposed on a side of the spring receiving portion most distal to the base portion.

13. A friction clutch as claimed in claim 10 wherein the base portion comprises a first base diameter portion and a second base diameter portion disposed within respectively a first diameter portion of the ferrule aperture and a second diameter portion of the ferrule aperture with the first base diameter portion being larger than the second base diameter portion and the first diameter portion of the ferrule aperture being larger than the second diameter portion of the ferrule aperture at least one of the first base diameter portion and the second base diameter portion serving as the pilot portion and the first base diameter portion serves as the travel limit portion.

14. A friction such as claimed in claim 10 wherein the end of the travel limit portion most distal to the receiving portion is substantially flush with an outer surface of the cover, the outer surface being disposed on an outside of the cover.

* * * * *